Sept. 19, 1939.  A. Y. DODGE  2,173,604
HYDRAULIC DRIVE UNIT
Filed Sept. 13, 1937   2 Sheets-Sheet 1
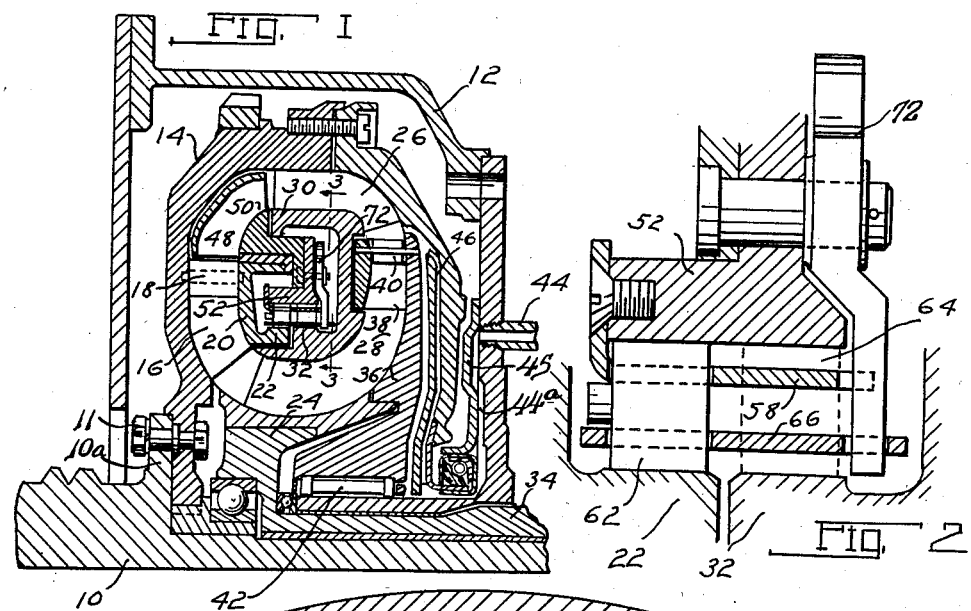
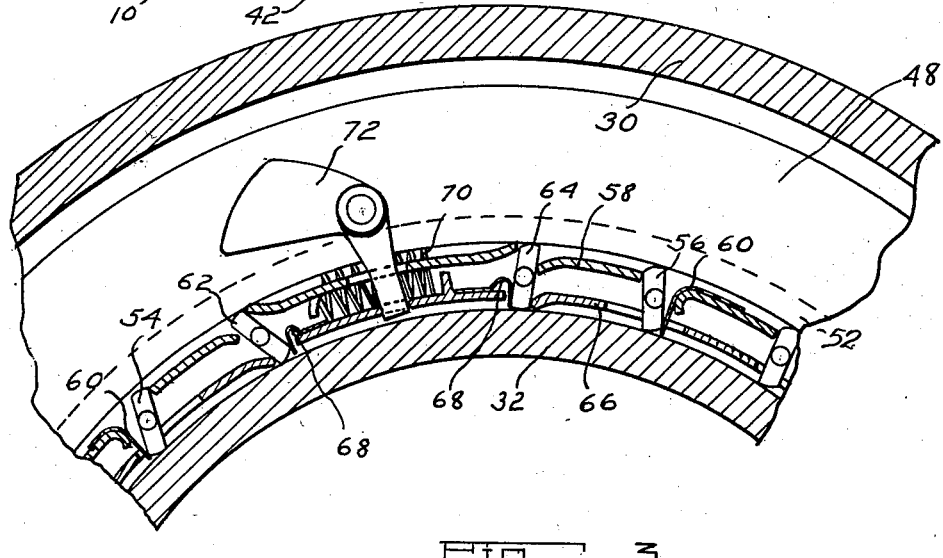
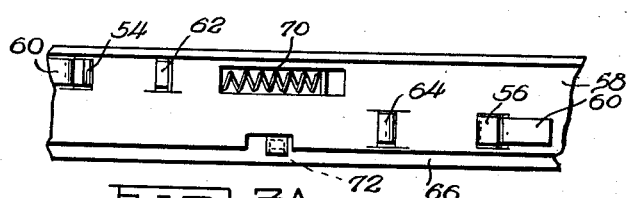
INVENTOR.
ADIEL Y. DODGE
BY McConkey Dawson & Booth
ATTORNEYS.

INVENTOR.
ADIEL Y. DODGE
BY McConkey Dawson & Booth
ATTORNEYS.

Patented Sept. 19, 1939

2,173,604

UNITED STATES PATENT OFFICE 2,173,604

HYDRAULIC DRIVE UNIT

Adiel Y. Dodge, South Bend, Ind.

Application September 13, 1937, Serial No. 163,571

19 Claims. (Cl. 60—54)

This invention relates to hydraulic drive units and more particularly to hydraulic torque converters operable throughout a range of from relatively high torque multiplication to a clutch condition of substantially one to one ratio.

One of the objects of the invention is to provide a hydraulic drive unit which will operate efficiently throughout a wide range of torque and speed ratios.

Another object of the invention is to provide a hydraulic drive unit including an auxiliary vaned member which is connected either to the driving or the driven member of the unit. According to an important feature of the invention this connection is preferably controlled automatically in accordance with the speed of the auxiliary member.

Still another object is to provide simple and positive means for connecting the auxiliary member to either the driving or the driven member of a hydraulic unit.

Other objects, advantages and novel features of the invention including desirable subcombinations and structural elements will be apparent from the following description when read in connection with the accompanying drawings, in which:

Figure 1 is a partial axial section of a hydraulic torque converter embodying the invention;

Figure 2 is an enlarged partial section of the clutch mechanism of Figure 1;

Figure 3 is a partial section on the line 3—3 of Figure 1;

Figure 3a is a partial plan view with parts removed illustrating the clutch mechanism;

Figure 4:
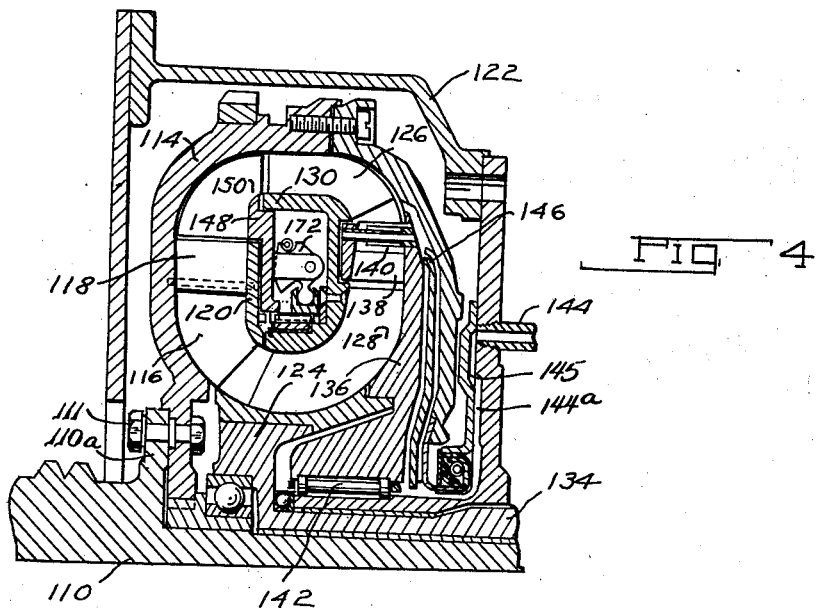
Figure 4 is a view similar to Figure 1 of a modified construction.

The torque converter of Figures 1 to 3 comprises a driving shaft 10 which may be the crankshaft of an engine or a suitable extension thereof and which extends through a stationary housing 12. The driving shaft is formed with a flange 10a within the housing which is connected by bolts 11 to an impeller casing 14 to which is secured a set of fixed vanes 16 and a set of pivoted vanes 18. These vanes may take the form more particularly described and claimed in any of my copending applications Serial Nos. 57,520 or 95,117. The vanes 16 and 18 carry a core member 20 formed with an outwardly facing clutch race 22 for a purpose to appear later.

A rotor is mounted within the casing 14 and includes a hub 24 carrying two spaced sets of vanes 26 and 28 connected by a core member 30 which cooperates with the member 20 to form an annular hollow core. A clutch race 32 is formed on the core 30 of substantially the same size as and parallel to the race 22. The hub 24 is preferably carried by a sleeve 34 which forms a driven shaft and which is journalled on the shaft 10 and which may be connected to a differential gear set as more fully described and claimed in my copending application Serial No. 723,083.

A stator is arranged between the two sets of rotor vanes and comprises a hub 36 carrying a set of fixed outlet vanes 38 and a set of pivoted inlet vanes 40. The stator hub is mounted on an extension of the fixed housing 12 by a one-way clutch and bearing 42 which will permit it to turn in the forward direction but will prevent rotation in the reverse direction.

Liquid is circulated through the unit during operation from a pipe 44 communicating with the inner end of a vaned radial passage 46 in the impeller casing through a passage 44a formed by a baffle 45 secured to the housing 12. Centrifugal force in the passage 46 forces the liquid out and into the fluid circuit through a space between the stator and the casing 14. The liquid leaves the unit through the spaces between the rotor hub and the impeller casing and flows out around the shaft 10 and the sleeve 34, lubricating the several bearings associated with the shaft and sleeve.

When it is desired to effect a high torque multiplication I have found that better results and greater efficiency can be obtained if the impeller is relatively short radially as compared to the rotor. On the other hand as the ratio approaches one to one better results are obtained with the impeller and rotor more nearly the same length radially. In order to obtain optimum operating conditions at all times there is provided, according to the present invention, an auxiliary vaned member between the impeller outlet and the rotor inlet which is adapted to form a part of the rotor during high torque multiplication and a part of the impeller as the drive approaches unity.

As shown in Figures 1 to 3 this auxiliary member includes a core part 48 carrying a set of vanes 50 which extend from adjacent the outlet end of the impeller vanes 18 to adjacent the inlet end of rotor vanes 26. The core 48 is rotatably supported by the impeller core member 20 and is formed with an inwardly facing clutch race 52 opposite the races 22 and 32.

In order to control the auxiliary member a plurality of sets of one way gripper elements may be provided between the clutch races. As shown in Figure 3 a set of gripper elements 54 is arranged between the races 22 and 52 to prevent the auxiliary member from overrunning the impeller. These elements are provided only to prevent free wheeling under all conditions and may be omitted where free wheeling is not objectionable. A second set of gripper elements 56 may be provided between races 32 and 52 to prevent the rotor from overrunning the auxiliary member. In conjunction with the elements 54, the elements 56 prevent the rotor from overrunning the impeller at any time. However, since overrunning of the rotor will be resisted by the liquid in the torque converter the elements 56 may be omitted except where positive insurance against free wheeling is desired. The elements 54 and 56 are held in spaced relationship by a cage 58 fixed to the race 52 and carrying springs 60 urging the elements 54 and 56 into gripping position.

A third set of gripper elements 62 is mounted between the races 22 and 52 acting in the opposite direction to the elements 54 and a fourth set 64 is mounted between the races 32 and 52 acting in the opposite direction to the elements 56.

The grippers 62 and 64 are held in spaced relationship by the cage 58 and are controlled by a second cage 66 which is movably mounted inwardly of the cage 58 and which carries springs 68 engaging the inner ends of the grippers 62 and 64. The cage 66 is constructed with the gripper engaging portions so spaced that when the grippers 62 are in operative position the grippers 64 are in inoperative position and vice-versa. Thus these grippers in conjunction with the grippers 54 and 56 serve to connect the ring 52 to either the ring 22 or the ring 32. In other words the auxiliary member is connected to either the impeller or the rotor.

The movable cage 66 is controlled by springs 70 acting between abutments on the cages 58 and 66 and urging the cage 66 into the position shown in Figure 3. This is the high torque position in which the grippers 64 are effective to clutch the auxiliary member to the rotor and the grippers 62 are ineffective.

In order to shift the cage 66 there are provided a plurality of centrifugal weights 72 pivoted on the core member 48 and having extensions engaging the cage 66. When the torque converter is stationary or is turning at low speed the springs 70 urge the cage 66 to the right to the position shown in Figure 3 in which the elements 62 are inoperative and the elements 64 are operative to connect the auxiliary member to the rotor. As the speed increases the weights 72 tend to move out and exert a force urging the ring 66 to the left. However, since the elements 64 are normally loaded during torque delivery the ring will not be shifted until the torque is temporarily relieved as by momentarily closing the engine throttle, or until the speed reaches an extremely high value. At this time the ring 66 will shift to move elements 64 to inoperative position and elements 62 to operative position to connect the auxiliary member to the impeller.

This shifting arrangement presents several advantages in that it produces a condition of synchronization at the time of shifting to eliminate shock, it leaves the shift at least partly under the control of the driver, and it eliminates any tendency to fluctuate between the two conditions as would result with a purely speed responsive control. Of course in reducing speed there is no load on the elements 62 and the ring 66 will be shifted back to the position of Figure 3 at a predetermined speed depending on the strength of springs 70 and the weights 72.

Figure 5:
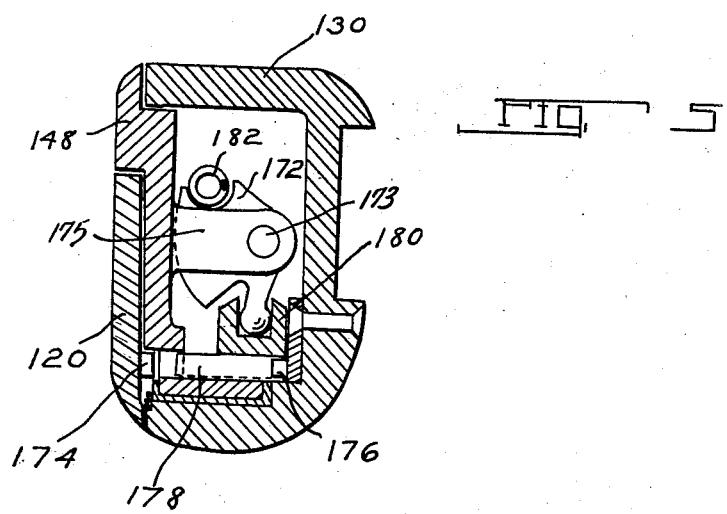
Figure 5 is an enlarged partial section of the clutch mechanism of Figure 4.

Figures 4 and 5 illustrate a modified arrangement for controlling the auxiliary member, parts therein corresponding to like parts in Figures 1 to 3 being indicated by the same reference numerals plus 100. In this construction the impeller core 120 carries a dog clutch part 174 and the rotor core 130 carries a similar clutch part 176. The auxiliary core part 148 slidably carries a double acting clutch member 178 adapted to engage with either of the clutches 174 or 176 and which is actuated by a collar 180. Weights 172 are pivoted on pins 173 carried by ears 175 on the member 148 and are formed with rounded ends engaging the collar 180 to move it, the weights normally being held in their inward position by a garter spring 182.

When the auxiliary member is turning at low speed the parts will occupy the position shown in Figure 5 with clutch members 176 and 178 engaged to connect the auxiliary member to the rotor. As the speed of the rotor and auxiliary member increases the weights 172 will move out, shifting the clutch member 178 out of engagement with clutch part 176 and into engagement with clutch part 174 to connect the auxiliary member to the impeller. In this arrangement the fluid reaction on the auxiliary member loads the clutches so that the force exerted by the centrifugal members is not sufficient to shift them until the torque on the impeller is momentarily relieved to relieve fluid reaction on the auxiliary member or until an extremely high speed is reached.

While two embodiments of the invention have been shown and described in detail it will be understood that many changes might be made therein and it is not intended to limit the scope of the invention to the forms shown nor otherwise than by the terms of the appended claims.

What is claimed is:

1. A hydraulic drive unit comprising a vaned impeller member, a vaned rotor member, an auxiliary vaned member lying between the impeller outlet and the rotor inlet, said members comprising a liquid circuit and means responsive to the speed of one of said members for connecting the auxiliary member to either the impeller or the rotor.

2. A hydraulic drive unit comprising a vaned impeller member, a vaned rotor member, an auxiliary vaned member lying between the impeller outlet and the rotor inlet, said members comprising a liquid circuit and means responsive to the speed of the auxiliary member for connecting the auxiliary member to either the impeller or the rotor.

3. A hydraulic drive unit comprising a vaned impeller member, a vaned rotor member, an auxiliary vaned member lying between the impeller outlet and the rotor inlet, said members comprising a liquid circuit, means for normally connecting the auxiliary member to the impeller, and means responsive to the speed of one of said members for disconnecting the auxiliary member from the impeller and connecting it to the rotor.

4. A hydraulic torque converter comprising a vaned impeller, a vaned rotor, a vaned stator and a vaned auxiliary member forming a liquid circuit, and means for connecting the auxiliary member to either the impeller or the rotor to turn therewith.

5. A hydraulic torque converter comprising a vaned impeller member, a vaned rotor member, a vaned stator and a vaned auxiliary member forming a liquid circuit, means for connecting the auxiliary member to either the impeller or the rotor to turn therewith and means responsive to the speed of one of said members to operate said last named means.

6. A hydraulic torque converter comprising a vaned impeller, a vaned rotor, a vaned stator and a vaned auxiliary member forming a liquid circuit, means for connecting the auxiliary member to either the impeller or the rotor to turn therewith, and means responsive to the speed of the auxiliary member to operate said last named means.

7. A hydraulic torque converter comprising a vaned impeller member, a vaned rotor member, a vaned stator and a vaned auxiliary member forming a liquid circuit, cooperating clutch members on the auxiliary member and on the impeller and rotor, and means responsive to the speed of one of said members for shifting said clutch members to connect the auxiliary member either to the impeller or the rotor.

8. A hydraulic torque converter comprising a vaned impeller, a vaned rotor, a vaned stator and a vaned auxiliary member forming a liquid circuit, cooperating clutch members on the auxiliary member and on the impeller and rotor, and means responsive to the speed of the auxiliary member for shifting said clutch members to connect the auxiliary member either to the impeller or the rotor.

9. A hydraulic torque converter comprising a vaned impeller, a vaned rotor, a vaned stator and a vaned auxiliary member forming a liquid circuit, one-way clutch means to prevent relative rotation between the auxiliary member and the impeller and rotor respectively in one direction, one-way clutch means to prevent relative rotation between the auxiliary member and the impeller and rotor in the other direction, and means to control one of said one-way clutch means to control connection of said auxiliary member to the impeller or the rotor.

10. A hydraulic torque converter comprising a vaned impeller, a vaned rotor, a vaned stator and a vaned auxiliary member forming a liquid circuit, one-way clutch means to prevent relative rotation between the auxiliary member and the impeller and rotor respectively in one direction, one-way clutch means to prevent relative rotation between the auxiliary member and the impeller and rotor in the other direction, and means responsive to the speed of the auxiliary member to control one of said one-way clutch means to control connection of the auxiliary member to the impeller or the rotor.

11. A hydraulic torque converter comprising a vaned impeller, a vaned rotor, a vaned stator, a vaned auxiliary member between the impeller outlet and the rotor inlet, said members comprising a liquid circuit, oppositely acting one-way clutch means between the auxiliary member and the impeller, oppositely acting one-way clutch means between the auxiliary member and the rotor, and control means for said one-way clutch means to control connection between the auxiliary member and the impeller or the rotor.

12. A hydraulic torque converter comprising a vaned impeller, a vaned rotor, a vaned stator, a vaned auxiliary member between the impeller outlet and the rotor inlet, said members comprising a liquid circuit, oppositely acting one-way clutch means between the auxiliary member and the impeller, oppositely acting one-way clutch means between the auxiliary member and the rotor, and control means responsive to the speed of the auxiliary member for said one-way clutch means to control connection between the auxiliary member and the impeller or the rotor.

13. A hydraulic torque converter comprising a vaned impeller, a vaned rotor, a vaned stator, a vaned auxiliary member between the impeller outlet and the rotor inlet, said members comprising a liquid circuit, a clutch race on the auxiliary member, a pair of clutch races on the impeller and rotor respectively facing said first named clutch race, gripper elements between the first named race and the last named races, and means to control said gripper elements to clutch the auxiliary member to either the impeller or the rotor.

14. A hydraulic torque converter comprising a vaned impeller, a vaned rotor, a vaned stator, a vaned auxiliary member between the impeller outlet and the rotor inlet, said members comprising a liquid circuit, a clutch race on the auxiliary member, a pair of clutch races on the impeller and rotor respectively facing said first named clutch race, gripper elements between the first named race and the last named races and means responsive to the speed of the auxiliary member to control said gripper elements to clutch the auxiliary member to either the impeller or the rotor.

15. A hydraulic torque converter comprising a vaned impeller, a vaned rotor, a vaned stator, a vaned auxiliary member between the impeller outlet and the rotor inlet, said members comprising a liquid circuit, a clutch race on the auxiliary member, a pair of clutch races on the impeller and rotor respectively facing said first named clutch race, gripper elements between the first named race and the last named races, a movably mounted cage engaging said gripper elements, and means to shift the cage to render some of the gripper elements operative and others thereof inoperative to connect said auxiliary member either to the impeller or the rotor.

16. A hydraulic torque converter comprising a vaned impeller, a vaned rotor, a vaned stator, a vaned auxiliary member between the impeller outlet and the rotor inlet, said members comprising a liquid circuit, a clutch race on the auxiliary member, a pair of clutch races on the impeller and rotor respectively facing said first named clutch race, two sets of gripper elements effective in opposite directions between the first named race and the impeller race, two sets of gripper elements effective in opposite directions between the first named race and the rotor race, and means controlling one of each of said two sets of gripper elements to render one set effective and the other set ineffective to connect said auxiliary member either to the impeller or the rotor.

17. A hydraulic torque converter comprising a vaned impeller, a vaned rotor, a vaned stator, a vaned auxiliary member between the impeller outlet and the rotor inlet, said members comprising a liquid circuit, a clutch race on the auxiliary member, a pair of clutch races on the impeller and rotor respectively facing said first named clutch race, two sets of gripper elements effective in opposite directions between the first named race and the impeller race, two sets of gripper elements effective in opposite directions between the first named race and the rotor race, a relatively stationary cage holding said gripper elements in spaced relationship, a movable cage engageable with one of each of said two sets of gripper elements, and means for moving said cage to render one set effective and the other set ineffective to connect said auxiliary member either to the impeller or the rotor.

18. A hydraulic torque converter comprising a vaned impeller, a vaned rotor, a vaned stator, a vaned auxiliary member between the impeller outlet and the rotor inlet, said members comprising a liquid circuit, a clutch race on the auxiliary member, a pair of clutch races on the impeller and rotor respectively facing said first named clutch race, two sets of gripper elements effective in opposite directions between the first named race and the impeller race, two sets of gripper elements effective in opposite directions between the first named race and the rotor race, a relatively stationary cage holding said gripper elements in spaced relationship, a movable cage engageable with one of each of said two sets of gripper elements, and means responsive to the speed of the auxiliary member for moving said cage to render one set effective and the other set ineffective to connect said auxiliary member either to the impeller or the rotor.

19. A hydraulic torque converter comprising a vaned impeller member, a vaned rotor member and a vaned auxiliary member forming a liquid circuit, clutch means for connecting the auxiliary member to either the impeller or the rotor, means responsive to the speed of one of said members controlling said clutch means, said clutch means being so constructed and arranged as frictionally to resist shifting while under load whereby shifting of the clutch means will occur only above a predetermined speed when the torque load is momentarily relieved.

ADIEL Y. DODGE.